Dec. 19, 1933.  R. L. HASCHE  1,939,694
SULPHUR DIOXIDE PROCESS
Original Filed Oct. 11, 1928
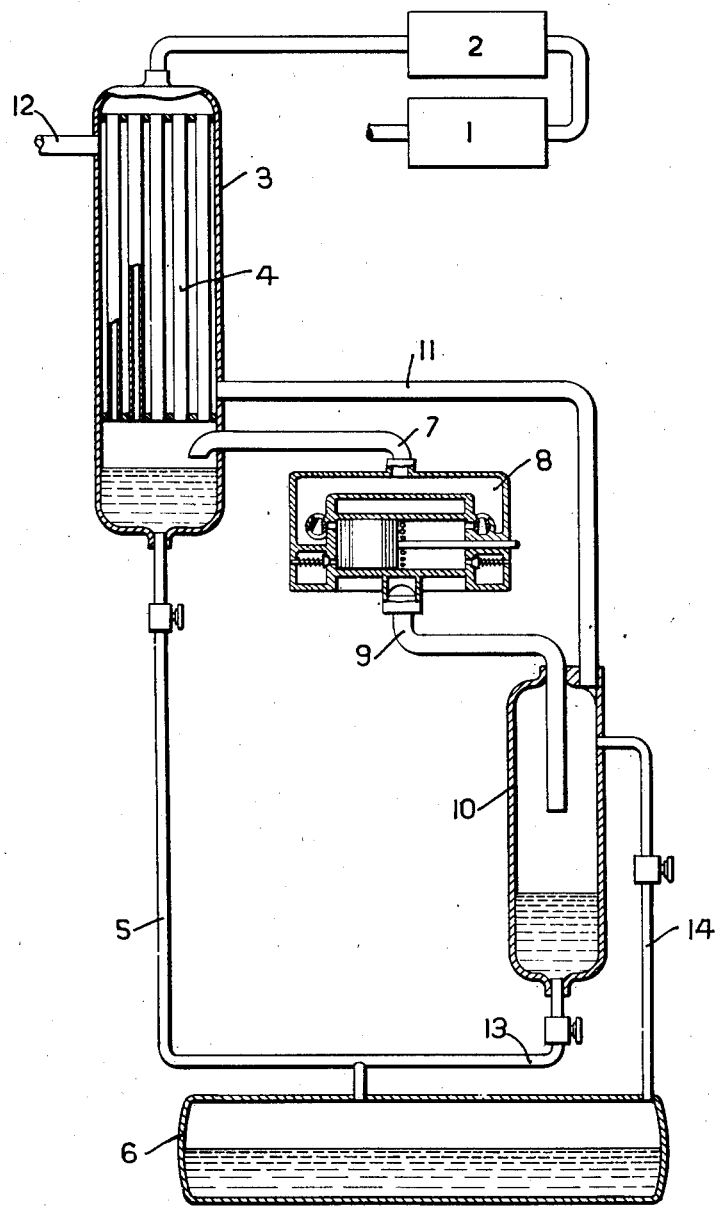
Inventor
Rudolph Leonard Hasche
By his Attorney Albert M. Austin Patented Dec. 19, 1933

1,939,694

UNITED STATES PATENT OFFICE 1,939,694

SULPHUR DIOXIDE PROCESS

Rudolph Leonard Hasche, Elizabeth, N. J., assignor to American Smelting and Refining Company, New York, N. Y., a corporation of New Jersey Application October 11, 1928, Serial No. 311,719
Renewed May 26, 1933

7 Claims. (Cl. 183—115)

This invention relates to the separation of gases, and more particularly to a process for separating and recovering sulphur dioxide from a mixture of waste gases.

The separation is accomplished in accordance with the present invention by compression and liquefaction, the pressure and temperature obtained being such that the sulphur dioxide becomes liquid whereas the remaining constituents pass off in the gaseous state. The process is preferably carried out in two steps and a certain amount of the energy is recovered by means of an expanding engine.

The invention further provides new and improved means for drying the gas which utilizes the selective properties of certain absorbent materials.

The invention further provides for utilizing the liquefied sulphur dioxide as a lubricant and for the recovery of a large part of the sensible heat of the system by means of suitable heat exchangers.

The invention further consists in the new and novel features of operation and the new and original arrangements and combinations of steps in the process hereinafter described and more particularly set forth in the claims.

Although the novel features which are believed to be characteristic of this invention will be particularly pointed out in the claims appended hereto, the invention itself, as to its objects and advantages, the mode of its operation and the manner of its organization may be better understood by referring to the following description taken in connection with the accompanying drawing forming a part thereof, in which the figure is a diagrammatic representation of one form of apparatus suitable for practicing the present invention.

The process of the present invention comprises drying suitably scrubbed and cleaned mixtures of gases, compressing the gases to a high pressure, cooling the compressed gases to a sufficiently low temperature to liquefy a substantial portion of the sulphur dioxide, further reducing the temperature of the gases by allowing the same to expand whereby the greater part of the remainder of the sulphur dioxide is liquefied and utilizing the stripped gases from the second step to cool further quantities of incoming gases. The temperatures obtained in the two steps may vary within comparatively wide limits depending upon the percentage of sulphur dioxide present in the original gas and the percentage of recovery desired.

Referring to the drawing more in detail, the gases to be treated, after being cleaned, are compressed to a suitably high pressure and passed through a plurality of beds 1—2 of adsorbent material, as for example, silica gel by means of which the moisture is removed from the gas and prevented from freezing at a later stage of the process. The dried gases are then applied to heat exchanger 3 and are passed through pipes 4 which are surrounded with a suitable cooling medium. The gases are cooled in heat exchanger 3 to a temperature at which a substantial portion of the sulphur dioxide becomes liquid and is collected at the bottom of said heat exchanger from which it may be withdrawn through pipe 5 into a storage tank 6.

The gases are then passed through pipe 7 into an expanding engine 8 wherein they are expanded to a pressure slightly above atmospheric and are cooled to a temperature slightly above the solidification temperature of sulphur dioxide.

Expanding engine 8 is preferably of the uniflow type fitted with auxiliary valves so that the reversal of the incoming gases is largely prevented with consequent improved venting of the expanded gas mixture and improved temperature conditions throughout the cycle as compared with what would obtain when using an engine of the counter-flow type.

After passing through the uniflow engine the gases are led through pipe 9 into separator 10 in which the liquid sulphur dioxide is collected. The stripped gases are then passed through pipe 11 into heat exchanger 3 wherein they are passed around pipes 4 and serve as a cooling medium for the incoming gases. They are then vented through pipe 12 into the atmosphere or into the furnace stack as the occasion may require. The liquid sulphur dioxide may be withdrawn from separator 10 into storage tank 6 through pipe 13. A pressure equalization pipe 14 interconnects the separator and storage tank and permits the pressure to be equalized so that the liquid sulphur dioxide may flow into the latter by gravity. Suitable valves in pipes 5, 13 and 14 permit the rate of discharge of the liquid material to be accurately controlled, whereas the pressure of the entire system is determined by the speed regulation and adjustable cutoff of the expanding engine.

As a specific example of one method of carrying on this process, the smelter gas may be compressed to a pressure of some 18 atmospheres, passed through a suitable cleaning system and cooled to approximately atmospheric temperature. The gases are then dried before being applied to the heat exchange system for the liquefaction of the sulphur dioxide.

This drying is preferably accomplished by utilizing the selective properties of an adsorbent such as silica gel. This substance has been found to have a preferential and selective adsorption for water in the presence of sulphur dioxide.

As a specific example, if silica gel is saturated with dry sulphur dioxide at 0° C. a saturation value is obtained, which in a specific instance amounted to some 56% by weight of gel. Sulphur dioxide saturated with water vapor was then passed through the same gel, and water was found to replace the adsorbed sulphur dioxide to such an extent that the amount of the latter remaining in the gel decreased to 32%, while a total of 17% of water per weight of gel was adsorbed. This value constituted the "break point" of the gel for water under those particular conditions, that is, the point at which some water vapor goes through the gel unadsorbed. The break point is approximately 70% of the saturation value of the gel, or the point at which some water goes through the gel unadsorbed.

As an example of selective adsorptive properties, a gas under 18 atmospheres total pressure was passed through a bed of silica gel at a temperature of approximately 25° C. Under these conditions the various constituents were under the following partial pressures:

|   | mm. Hg. |
|---|---|
| Air mixture | 12,550 |
| Sulphur dioxide | 1,094 |
| Water vapor | 23 |
| Carbon dioxide | 4 |

In passing the above mixture through silica gel, the latter becomes saturated with sulphur dioxide after from 5 to 7 minutes, but continues to adsorb water vapor from the gas for several hours or until the break point is reached. Activation of the gel would then be carried out in any desired manner, as for example, by heating the gel to a temperature of 150° C.

In efficiently carrying on the process, two beds of adsorbent material may be employed. The first bed may be operated between the break point and saturation point for water vapor, and the second bed may be operated below the break point. In this manner the vapor in the first bed is adsorbed to the fullest capacity of the material contained therein, whereas the second bed prevents any vapor from passing out of the system unadsorbed. When the first bed approaches its saturation point and the second bed approaches its break point, the first bed may be removed and reactivated, the second bed substituted therefor in the system, and a third bed inserted in place of the second. The system may consequently be made practically continuous by the use of three or more beds.

The dried gases, after passing the silica gel beds, are applied to the heat exchanger at a pressure of 15 to 18 atmospheres and at approximately room temperature. In this exchanger they are cooled to a temperature of some —15° C. to —25° C., under which conditions approximately 50% of the total sulphur dioxide is liquefied and collected at the bottom of the exchanger. The gases are then passed through the expanding engine wherein they are expanded to a limiting pressure of 1½ to 2 atmospheres. During expansion the gas is cooled to a low temperature such as —70° C. due to expenditure of external work. The system should be so regulated, however, that the temperature approaches but does not fall below —73° C., the solidification temperature of sulphur dioxide.

The condensation of sulphur dioxide in the cylinder of the expanding engine furnishes the necessary lubrication for the piston. An expanding engine of the uniflow type is preferable since the sulphur dioxide is more readily vented through the center ports of this type engine than through the valves of a counter flow engine. Liquid sulphur dioxide at some —70° C. is then passed to the separator and the stripped gases of the same temperature are removed therefrom and applied to the heat exchanger.

Inasmuch as it is more efficient to operate this process with less than 100% adsorption of sulphur dioxide, the stripped gases may contain certain small percentages thereof and consequently may be vented into the furnace stack, if desired, instead of into the atmosphere. The stripped gases after leaving the heat exchanger, may, however, be utilized for cooling the silica gel beds after reactivation before applying them to the stack.

The efficiency of the above described process is high from a commercial standpoint by reason of the simplified apparatus which is employed and by reason of the utilization of the cooled gases of the system for the cooling medium of the heat exchanger. Furthermore, power may be recovered at the expanding engine and utilized for any desired purpose.

The process has been disclosed as particularly applied to smelter gases, but obviously is capable of being applied to the separation of other gases from various combinations thereof and is not intended to be limited to the specific elements mentioned in the description. Definite temperatures and pressures have been set forth by way of illustration, but it is to be understood that these figures are dependent upon the content of the gas under treatment and upon the percentage of recovery required.

The system may be regulated for controlling the heat balance by varying the initial pressure of the gas, the final pressure in the expanding engine or the temperature in the heat exchanger. For a gas containing from 8% to 10% of sulphur dioxide by volume the figures given in the specification have been found to produce a satisfactory balance.

Silica gel is specifically mentioned as illustrative of a selective adsorbent material. Other materials may, however, be employed which are capable of adsorbing moisture from the mixed gases in a similar manner to silica gel.

Although certain novel features of the invention have been shown and described and are pointed out in the annexed claims, it will be understood that various omissions, substitutions and changes in the several steps of the process and its operation and in the form and details of the apparatus illustrated may be made by those skilled in the art without departing from the spirit of the invention.

What is claimed is:

1. The process of separating gases which comprises compressing said gases to a comparatively high pressure, adsorbing moisture therefrom, cooling said gases at said high pressure to a sufficiently low temperature to liquefy a portion of a desired constituent, expanding said gases with the expenditure of external work whereby further cooling takes place and whereby a substantial portion of the remainder of said constituent is liquefied, separating the entire liquefied constituent and utilizing the stripped gases as the sole refrigerant in the aforementioned cooling operation.

2. The process of recovering sulphur dioxide from furnace gases, which comprises compressing said gases to a pressure of approximately 18 atmospheres, cooling said gases, passing said gases through a bed of suitable absorbent material whereby water is removed therefrom, cooling said gases in a heat exchanger to a temperature of $-25°$ C. whereby substantially half of the sulphur dioxide content becomes liquid, separating said liquid portion, further cooling said gases by expansion with the production of external work to a pressure of 1½ to 2 atmospheres whereby said gases are cooled to a temperature of approximately $-70°$ C. and substantially the entire remainder of the sulphur dioxide content is liquefied, and separating the entire liquefied content.

3. The process of recovering sulphur dioxide from furnace gases, which comprises compressing said gases to a pressure of approximately 18 atmospheres, cooling said gases, passing said gases in sequence through a pair of beds of silica gel saturated with sulphur dioxide whereby water is removed therefrom, the first of said beds being operated above its break point for water and the second of said beds being operated below said break point, cooling said gases in a heat exchanger to a temperature of $-25°$ C. whereby substantially half of the sulphur dioxide content becomes liquid, separating said liquid portion, further cooling said gases by expansion with the production of external work to a pressure of 1½ to 2 atmospheres whereby said gases are cooled to a temperature of approximately $-70°$ C. and substantially the entire remainder of the sulphur dioxide content is liquefied, and separating the entire liquefied content.

4. The process of recovering sulphur dioxide from furnace gases, which comprises compressing said gases to a pressure of approximately 18 atmospheres, cooling said gases, passing said gases in sequence through a pair of beds of adsorbent material saturated with sulphur dioxide whereby water vapor is removed therefrom, the first of said beds being operated above its break point for water and the second of said beds being operated below said break point, cooling said gases in a heat exchanger to a temperature at which substantially half of the sulphur dioxide content becomes liquid, separating said liquid portion, further cooling said gases by expansion with the production of external work to a pressure above atmospheric whereby said gases are cooled to a temperature at which substantially the entire remainder of the sulphur dioxide content is liquefied, and separating the entire liquefied content.

5. The process of recovering sulphur dioxide from furnace gases, which comprises compressing said gases to a pressure of approximately 18 atmospheres, cooling said gases, passing said gases in sequence through a bed of adsorbent material saturated with sulphur dioxide whereby water is removed therefrom, cooling said gases in a heat exchanger to a temperature at which a substantial portion of the sulphur dioxide content becomes liquid, separating said liquid portion, further cooling said gases by expansion with the production of external work to a pressure above atmospheric whereby said gases are cooled to a temperature at which substantially the entire remainder of the sulphur dioxide content is liquefied, separating the entire liquefied content, and utilizing the stripped gases from the final stage as the sole refrigerant for cooling further quantities of incoming gases in the heat exchanger.

6. The process of separating gases which comprises compressing said gases and passing the same through a bed of adsorbent material which is capable of preferentially adsorbing moisture when saturated with one constituent of said gas mixture, further cooling said gases by expansion with the production of external work to substantially the solidification temperature of said constituent whereby a substantial amount thereof is liquefied, separating the liquefied constituent and utilizing the stripped gases as the sole refrigerant in the above mentioned cooling operation.

7. The process of separating sulphur dioxide from furnace gases which comprises compressing said gases and passing the same through a bed of suitable absorbent material whereby said bed preferentially adsorbs moisture from said gases, cooling said gases by expansion with the production of external work to approximately the solidification temperature of sulphur dioxide whereby a substantial amount thereof becomes liquefied, removing the liquefied constituent and utilizing the stripped gases as the sole refrigerant in the above mentioned cooling operation.

RUDOLPH LEONARD HASCHE.